US008831020B2

(12) United States Patent
Ylimartimo (10) Patent No.: US 8,831,020 B2
(45) Date of Patent: Sep. 9, 2014

(54) METHOD AND DEVICE ARRANGEMENT FOR IMPLEMENTING REMOTE CONTROL OF PROPERTIES

(75) Inventor: Veikko Ylimartimo, Oulu (FI)

(73) Assignee: Tosibox Oy (FI)

( * ) Notice: Subject to any disclaimer, the term of this patent is extended or adjusted under 35 U.S.C. 154(b) by 0 days.

(21) Appl. No.: 14/001,111

(22) PCT Filed: Feb. 9, 2012

(86) PCT No.: PCT/FI2012/050127
§ 371 (c)(1),
(2), (4) Date: Oct. 9, 2013

(87) PCT Pub. No.: WO2012/113975
PCT Pub. Date: Aug. 30, 2012

(65) Prior Publication Data
US 2014/0040435 A1 Feb. 6, 2014

(30) Foreign Application Priority Data
Feb. 22, 2011 (FI) .................................. 20115168

(51) Int. Cl.
*H04L 12/56* (2006.01)
*H04L 12/28* (2006.01)
*H04L 29/06* (2006.01)
*H04L 12/46* (2006.01)
*H04L 29/08* (2006.01)

(52) U.S. Cl.
CPC .......... *H04L 67/125* (2013.01); *H04L 12/2818* (2013.01); *H04L 65/1069* (2013.01); *H04L 12/4633* (2013.01); *H04L 63/0272* (2013.01)
USPC ........... 370/401; 370/254; 370/352; 709/219; 709/227

(58) Field of Classification Search
None
See application file for complete search history.

(56) References Cited

U.S. PATENT DOCUMENTS 7,590,074 B1 * 9/2009 Dondeti et al. ............... 370/254
7,631,086 B2 * 12/2009 Carmello et al. ............. 709/227
(Continued)

FOREIGN PATENT DOCUMENTS

| EP | 1441483 A2 | 7/2004 |
| EP | 1912413 A1 | 4/2008 |

(Continued)

OTHER PUBLICATIONS

Office Action issued in corresponding Japanese Patent Application No. 2013-554921 dated Feb. 10, 2014.

(Continued)

*Primary Examiner* — Ian Moore
*Assistant Examiner* — Lakeram Jangbahadur
(74) *Attorney, Agent, or Firm* — Volpe and Koenig, P.C.

(57) ABSTRACT

In a remote control method and system, a virtual private network is created between a home control network key and a home control network device. Both the home control network key and the home control network device determine their network paths to the Internet from the data transfer network to which they are connected. The determined network paths are stored in a home control network server on the Internet. When it is desired to form a virtual private network, the home control network server supplies the stored network paths to the home control network key and the home control network device. By using the received network paths, the home control network key and the home control network device create between them a virtual private network, to which the client device used by the person performing the remote-controlling and the actuators to be remote-controlled are also connected to implement the remote control.

7 Claims, 5 Drawing Sheets

(56) References Cited

U.S. PATENT DOCUMENTS

| | | |
|---|---|---|
| 7,899,919 B2 * | 3/2011 | Song et al. ............... 709/229 |
| 8,683,012 B2 * | 3/2014 | Emmerich et al. .......... 709/219 |
| 2003/0001883 A1 | 1/2003 | Wang |
| 2003/0214955 A1 | 11/2003 | Kim |
| 2004/0148439 A1 | 7/2004 | Harvey et al. |
| 2005/0044262 A1 * | 2/2005 | Luo ........................... 709/238 |
| 2006/0282498 A1 | 12/2006 | Muro |
| 2008/0091763 A1 * | 4/2008 | Devonshire et al. ......... 709/201 |
| 2010/0014529 A1 * | 1/2010 | Takechi et al. .............. 370/401 |
| 2010/0085957 A1 * | 4/2010 | Elias et al. .................. 370/352 |
| 2010/0281162 A1 * | 11/2010 | Venkatraman et al. ...... 709/224 |
| 2011/0246630 A1 * | 10/2011 | Deutsch et al. .............. 709/222 |
| 2013/0232260 A1 * | 9/2013 | Narayana et al. ............ 709/224 |

FOREIGN PATENT DOCUMENTS

| | | |
|---|---|---|
| JP | 2006344017 A | 12/2006 |
| JP | 2007235638 A | 9/2007 |
| WO | 2009055716 A1 | 4/2009 |

OTHER PUBLICATIONS

Kokko, K., "Turvajärjesteelmien etähallinta", Landen ammattikorkeakoulu, 2006, 62 pp., URL:https://publications.theseus.fi/bitstream/handle/10024/118663/2006-08-21-01.pdf.

Aug. 22, 2011 Search Report from the National Board of Patents and Registration of Finland for priority FI Application No. 20115168 (2 pgs.).

Jun. 28, 2012 International Search Report for International Application No. PCT/FI2012/050127 (5 pgs.).

Jun. 14, 2013 International Preliminary Report on Patentability for International Application No. PCT/FI2012/050127, including Annexes (26 pgs.).

* cited by examiner

METHOD AND DEVICE ARRANGEMENT FOR IMPLEMENTING REMOTE CONTROL OF PROPERTIES

FIELD OF INVENTION

The invention relates to a remote control method of actuators in a property and a remote control system with its components.

BACKGROUND

Remote-controllable devices and systems are increasingly installed in properties and homes. The purpose of the systems is to secure and/or maintain such conditions in properties, that living in them is both safe and pleasant. The spectrum of remote-controlled on remote-monitored devices is wide. The same property may have devices from several suppliers. These devices can often not communicate directly with one another. It is also common that each system has its operation logic, the remote controlling of which requires the use of a particular data communications solution.

Building service suppliers have lately started to solve the problem very generally by ordering from an operator for the customer target its own, separately costing additional connection, which contains certain target-specific agreed-on features and must be separately maintained, either via a telephone network or a broadband network, which broadband network can be a permanent of wireless 2G/3G network broadband connection. Most suppliers have found this to be the easiest mode of operation for them at the moment, even though it contains several problem points.

If a new additional connection is provided for the target, data communications matters must often be agreed upon separately with an administrator of the local intranet. The intranet administrator probably has to make additional network configurations for the connection, so that establishing a remote connection can succeed.

Often one must wait for an additional connection, especially a permanent network connection, for a long time, even many weeks. When the connection is finally received, it often does not work in the way agreed upon when ordering it from the operator, and one must negotiate about repair procedures and wait for the operator to act in the matter.

Operators still promise too much, when talking about the operation of wireless broadband connections. When the remote target is connected to the new wireless connection and it does not work correctly, prolonged and time-consuming, costly and on all parts draining negotiations are mostly ahead.

Additionally operators strive to commit customers to being connection users by lumping together the connection, a modem and for example a 24-month mandatory use time. Not all users however are willing to participate in this, but often want to "hold the reigns themselves".

There are always additional costs for starting up and using a new connection opened for remote use. Many private households or housing cooperatives are not prepared to pay additional costs.

On the other hand, if additional services, such as a permanent IP address or a dynamic domain name service, which enable remote use, are procured from the serving operator or the network connection provider on top of the already existing connection, the following kinds of problems may for example appear.

A permanent IP address is not obtained, whereby a dynamic domain name service must be used. If the remote use device supplier does not provide dynamic domain name service, it must be procured from the market. Dynamic domain name service is provided also by some free parties (for example maintained by some student parties), such as dyndns.org, dy.fi etc. The integration of these domain name services is varying and availability and reacting to operation problems generally insufficient for implementing reliable remote control of a property.

Nowadays connection establishment to broadband connections occurring from outside is often restricted so that remote use at a target does not work. Operators may for example completely prevent the opening of a connection occurring from the Internet to the connection. Thus joining a dynamic domain name service is not useful.

The operation of the dynamic domain name service also requires that the target obtains a public Internet address from the connection it uses. In order for this to be possible, the connection feature must support the operation of several public addresses.

One alternative for getting the target into operational state is that a network specialist programs the connection to be suitable for remote use on-site at the target.

Thus care must be taken that the operation of the other network devices and Internet connections of the connection is not prevented or disturbed. Additionally the original connection of the target often turns out to be unsuitable for remote use in its present form. Thus modems or connection type must be changed or alteration work must be negotiated with the operator.

Target-specifically customised solutions always incur additional costs for the service buyer. It is also an inefficient manner of operating for the service supplier.

One can try to solve remote use of the target also with an application-specific solution. Thus the device supplier can buy from the operator its own radio network and form in it a private access point name (APN), which determines data communications settings in GPRS (General Packet Radio Service) and HSDPA (High-Speed Downlink Packet Access)/HSUPA (High-Speed Uplink Packet Access) networks. By using APN settings, and Internet connection is provided via a wireless 2G/3G/4G network to the devices in the target. In such cases the user must pay separately for the connection and for the interface modems and programs enabling its remote use. Often such an additional connection cannot or may not be used for more than one use purpose, for example for the remote use of devices supplied by the building service supplier. Additionally operators nowadays generally limit the maximum amount of data transfer in such connections, which when exceeded may cause large additional invoices for the connection owner.

In housing cooperative type targets, which have several properties, the properties may be connected to "remote use" occurring only within the intranet formed between the properties. No "real" remote contact is obtained for such targets, if the remote contact user is physically elsewhere than in one of the properties in question in the intranet.

Routing information between any two arbitrary apparatuses can be stored on server. When an apparatus requests from the server route information of some other apparatus the server can send the required routing information to the apparatus that made the route information request or to both apparatuses.

US 2010/0014529 depicts a network communication apparatus which allows connection between two arbitrary network communication apparatuses in a network that discloses plural NAT routers. First the network communication apparatus automatically judges whether or not a direct local connection is possible to another arbitrary apparatus. The depicted network communication apparatus includes: a direct search unit which transmits a direct search request to another arbitrary network communication apparatus, a route information obtaining unit which obtains route information of the other arbitrary network communication apparatus from a server, and a communication control unit which performs, when the information regarding the other network communication apparatus is obtained upon the direct search request, communication with the other network communication apparatus based on the information, and which performs, when the information is not obtained, communication with the other network communication apparatus, based on the route information that has been received from the server.

U.S. Pat. No. 7,590,074 discloses a communication system where, when a network element at a VPN site needs routing information to communicate with another arbitrary VPN site, the network element will check if it has the required routing information. If not, it may obtain the route on-demand from the route server. Upon receipt of the route request message, the route server will cause routing information to be transmitted to the initiating VPN site, and optionally transmitted to the intended recipient VPN site to allow the VPN sites to update their routing tables and pass data directly to each other.

SUMMARY

It is an object of the invention to provide a new remote control arrangement for technical devices in a property and a remote control method utilising this remote control arrangement, where the Internet connection already existing in the properties and homes are utilised as such in the remote use of the building service and surveillance. With a remote use device pair according to the invention, the target connection of the property is altered to be as such suitable for remote use. Already existing functions of the data network connection in the target and the intranet in the target are not altered.

The objects of the invention are attained with a device arrangement, in which a home control network device installed in a fixed manner in a property and a home control network key of a person realising monitoring of the property establish a secure two-way connection over the Internet based on contact information they have received from a home control network server according to the invention. The home control network device in the property, to which the devices to be remote-controlled or remote-monitored in the property are connected, are connected to a data network connection device/network terminal in the property, for example a modem.

The current IP addresses of the home control network device and the home control network key are maintained in the home control network server related to the invention, which IP addresses are used for establishing a connection between said devices. Due to the additional procedures and the connection establishing methods according to the invention both said devices can be connected to some private, non-public network, and they can still establish among themselves a data transfer connection over the Internet. Advantageously it is enough for establishing the data transfer connection over the Internet between the mobile home control network key and the fixed installed home control network device that said devices at some point in the established connection also obtain a public IP address, even though simultaneously the home control network device and the home control network key only have non-public IP addresses. The home control network server does not participate in the establishing of the actual data transfer connection after it has sent the IP addresses of the devices to be available to the devices.

An advantage with the property remote control system according to the invention is that both the devices in the home control network device pair can search their routing from their placement location to the IP address of the device of the property connecting to the Internet and to store the searched route in a separate storage server on the Internet for the identification and IP address of the device pairs.

It is further an advantage of the invention that each home control network device pair according to the invention forms independently among themselves a predetermined unique device pair or device group, which identify each other in the net-work. Due to the identification method the home control network key carried with the user establishes a network connection only with its own unique home control network device pairs, and the connection cannot be established with any other network device. Thus the home control network key functions as a strong safety key to the "network doors" of the property.

It is further an advantage of the invention that the device pair of the remote control system according to the invention can among themselves independently with the aid of the address information of the home control network server establish a direct two-way secure OSI model (Open Systems Interconnection Reference Model) data link layer (Layer 2) level or also network layer (Layer 3) level data transfer connection through the serving local network devices and the Internet (VPN; Virtual Private Network) without having the established connection circulating at all through an external server. The data link layer level secured remote transfer connection is a basic requirement for many flexible uses and utilisations of building service control devices.

It is further an advantage of the invention that the device pair of the remote control system according to the invention works in the connection types of all Internet connection suppliers with the original network settings of the connection supplier. No alterations are needed in the customer connection data communications settings and/or terminals, but they are utilised as such safely and functionally with their own setting established at the time of installation.

It is further an advantage of the invention that the establishment of a remote control connection does thus not require additional connections, changing modems or firewalls in the customer connections or reprogrammings of the customer connection terminals or payment for the use of separate devices.

It is further an advantage of the invention that the establishment of a remote control connection is not dependent on the user's operating system (e.g. MAC, Windows) or terminal. It is sufficient that the remote user's terminal has a browser program, which the network server of the device to be remote-controlled supports. The terminal may also be both a stationary PC and a mobile device, such as a portable computer, a tablet device or a smartphone.

It is further an advantage of the invention that in the remote control system according to the invention, the remote use of different manufacturers' different home control network devices is possible in an operator-independent environment. One manufacturer's safety camera, a second manufacturer's surveillance camera, a third manufacturer's ground heat pump and a fourth manufacturer's air conditioning control system can be connected to the home control network device pair according to the invention.

It is further an advantage of the invention that the devices to be controlled and the controlling device may be in different operators' networks and the networks do not have to have the same type or brand of network technology. The device being controlled can for example be in a permanent broadband connection and the controlling device in a 3G or 2G network.

The remote control method according to the invention is characterised in that
- the user's client device controlling the actuators is connected to a first network terminal in a first data transfer network
- the actuator to be remote-controlled is connected to a second network terminal in a second data transfer network
- both the first network terminal and the second network terminal make contact with a home control network server
- both the first network terminal and the second network terminal request routing information from the home control network server for establishing an end-to-end data transfer connection between said network terminals and that
- the home control network server sends the requested routing information to the first network terminal and the second network terminal, by using which the first network terminal and the second network terminal establish among themselves a virtual private network, to which the home control network server does not belong.

A remote control system according to the invention, which comprises
- a first data transfer network, to a first network terminal connected to which a user's client device controlling actuators to be remote-controlled is connected
- at least one second data transfer network, to a second network terminal connected to which actuators to be remote-controlled are connected
- one or several other data transfer networks between the first data transfer network and the second data transfer network, one of which is the Internet network, and
- a home control network server connected to the Internet and which remote control system is characterised in that
- the first network terminal and the second network terminal are configured to establish a data transfer connection to the home control network server in order to establish the mutual end-to-end data transfer connection between said network terminals
- the first network terminal and the second network terminal are arranged to request routing information from the home control network server for establishing an end-to-end data transfer connection between said network terminals and that
- the home control network server is arranged to send the routing information to the first network terminal and the second network terminal, by using which the first network terminal and the second network terminal are arranged to establish among themselves a virtual private network, to which the home control network server does not belong.

The home control network key according to the invention is characterised in that a therein comprised processor, memory and therein stored computer program code are configured to
- determine a network path from the home control network key to the Internet
- store the determined network path both in the memory of the home control network key and in the memory of the home control network server
- request from the home control network server the network path information of its network terminal pair in order to establish an end-to-end data transfer connection between said network terminals
- receive from the home control network server the network path information of its network terminal device pair and
- establish with the aid of the received network path information with its network terminal pair a virtual private network for the remote control of the actuators of the property, to which virtual private network the home control network server does not belong.

The home control network device in the property according to the invention is characterised in that its processor, memory and therein stored computer program code are configured to
- determine a network path from the home control network device to the Internet
- store the determined network path both in the memory of the home control net-work device and in the memory of the home control network server
- request from the home control network server the network path information of its network terminal pair in order to establish an end-to-end data transfer connection between said network terminals
- receive from the home control network server the network path information of its network terminal device pair and
- establish with the aid of the received network path information with its network terminal pair a virtual private network for the remote control of the actuators of the property, to which virtual private network the home control network server does not belong.

The home control network server according to the invention is characterised in that its processor, memory and therein stored computer program code are configured to
- store in the memory of the home control network server the identification data of the network terminal pair formed by two network terminals used for remote control in a property
- receive from the network terminal pair the network path information they have determined
- receive from the first network terminal the network path information request of its network terminal pair
- check which is the device pair of the first network terminal that made the network path request
- send the network path information of the network terminal pair both to the first network terminal and the second network terminal
- receive cyber space information used in connection with the network terminal pair and send the allowed cyber space information to the home control network device and
- release the data transfer connection to the network device pair after the network path information is sent.

Some advantageous embodiments of the invention are presented in the dependent claims.

The basic idea of the invention is the following: In order to implement remote control, a device pair is manufactured, a home control network device and a home control network key, where the home control network device can establish a data transfer connection only with its home control network key pair. In one advantageous embodiment of the invention an individual home control network key can function as the device pair of two or more home control network devices in different properties. The identification codes of the home control network device and the home control network key are stored in said devices in connection with their manufacturing. By using the identification codes the home control network device and home control network key can establish a two-way data transfer connection between them. The data transfer connection can advantageously be based on an OSI model data link layer (Layer 2) or network layer (Layer 3).

In connection with installation, both devices determine routing information of the devices from their location network all the way to a network terminal connected to the Internet, which routing information is needed for the connection establishment. This routing information is stored in a home control network server according to the invention, connected to the Internet. When the home control network key wants to establish a data transfer connection via the Internet to its device pair in some property, it retrieves the routing information of the home control network device functioning as its pair from the home control network server. By utilising the obtained routing information the home control network key begins to establish a direct end-to-end data transfer connection. When the direct data transfer connection has been established, a direct VPN data transfer connection advantageously using the network layer has been established between the home control network key and the home control network device in the property.

A home control network device according to the invention is installed in the internal data transfer network of a property to be remote-controlled between an existing internal data transfer network related to control and management of the property and a network terminal relaying traffic from the property to the Internet. All devices related to property control are connected to the inputs of the home control network device and the output of the home control network device is connected to the input meant for the intranet device of the network terminal relaying Internet traffic.

The home control network key according to the invention can be connected to some data transfer device, which is able to establish a data transfer connection to the Internet. Possible data transfer devices are for example a PC, a tablet computer or a smartphone. The connection of the home control network key to the da-ta transfer device can be done for example with the aid of a LAN interface (Local Area Network), a WLAN interface (Wireless LAN), a WAN interface (Wide Area Network), a USB interface (Universal Serial Bus) or an antenna interface. When the home control network key is connected to the data transfer device, the home control network key first ascertains its own routing through different subnetworks to the Internet network terminal. When the routing is ascertained, the routing information of the home control network key is stored in the home control network server according to the invention.

When a two-way end-to-end data transfer channel is formed between the home control network key and the home control network device, device pair routing in-formation through different subnetworks stored in the home control network server is utilised for forming the data transfer channel. When the data transfer connection has been established, the data transfer takes place so that the home control network server does in no way participate in the data transfer any longer.

BRIEF DESCRIPTION OF THE DRAWINGS

In the following, the invention will be described in detail. In the description, reference is made to the appended drawings, in which.

DETAILED DESCRIPTION OF THE PREFERRED EMBODIMENTS

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
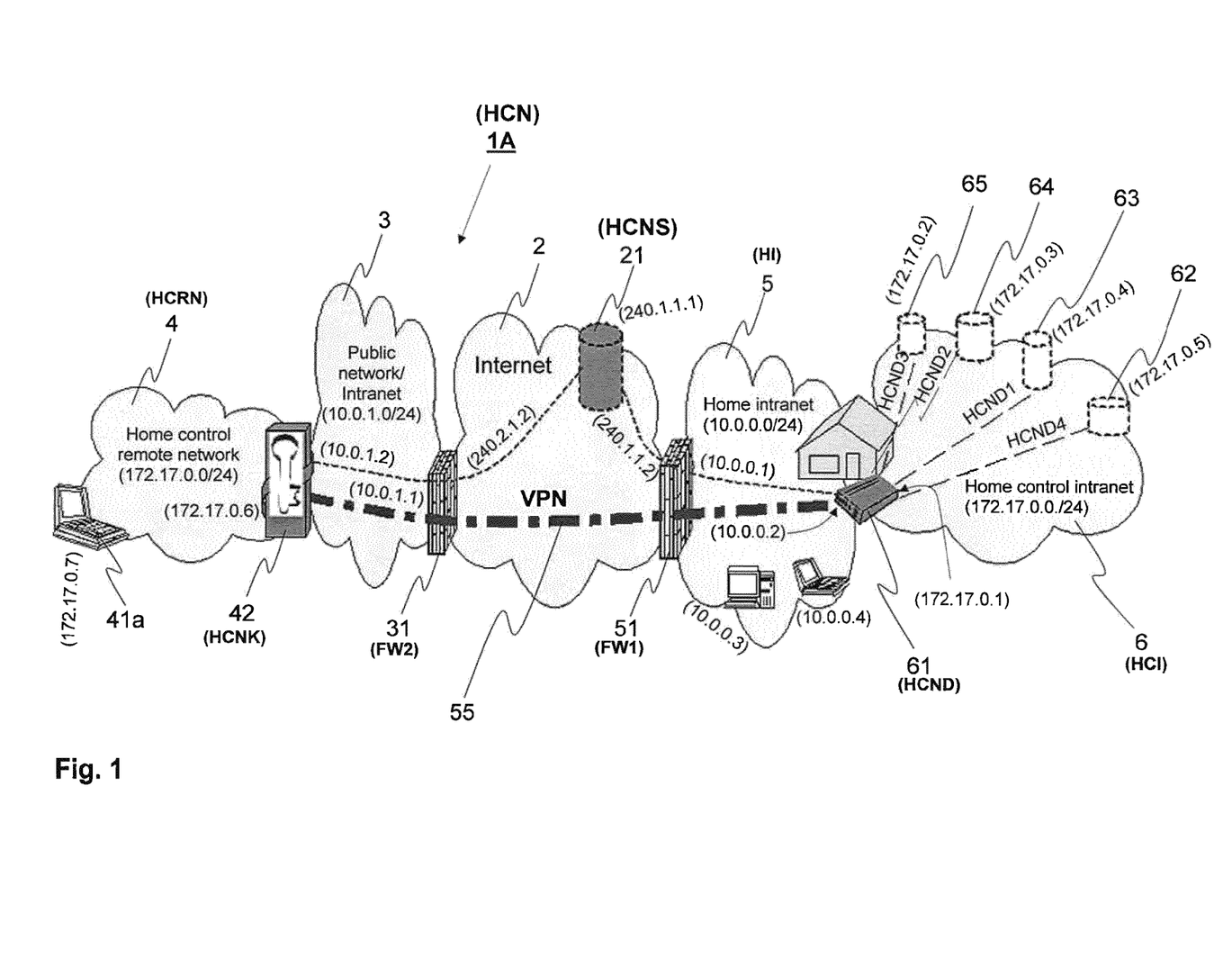
FIG. 1 shows as an example how a two-way data transfer connection according to the invention can be established between a client device handling remote control and an individual control and management device of a property.
Figure 2:
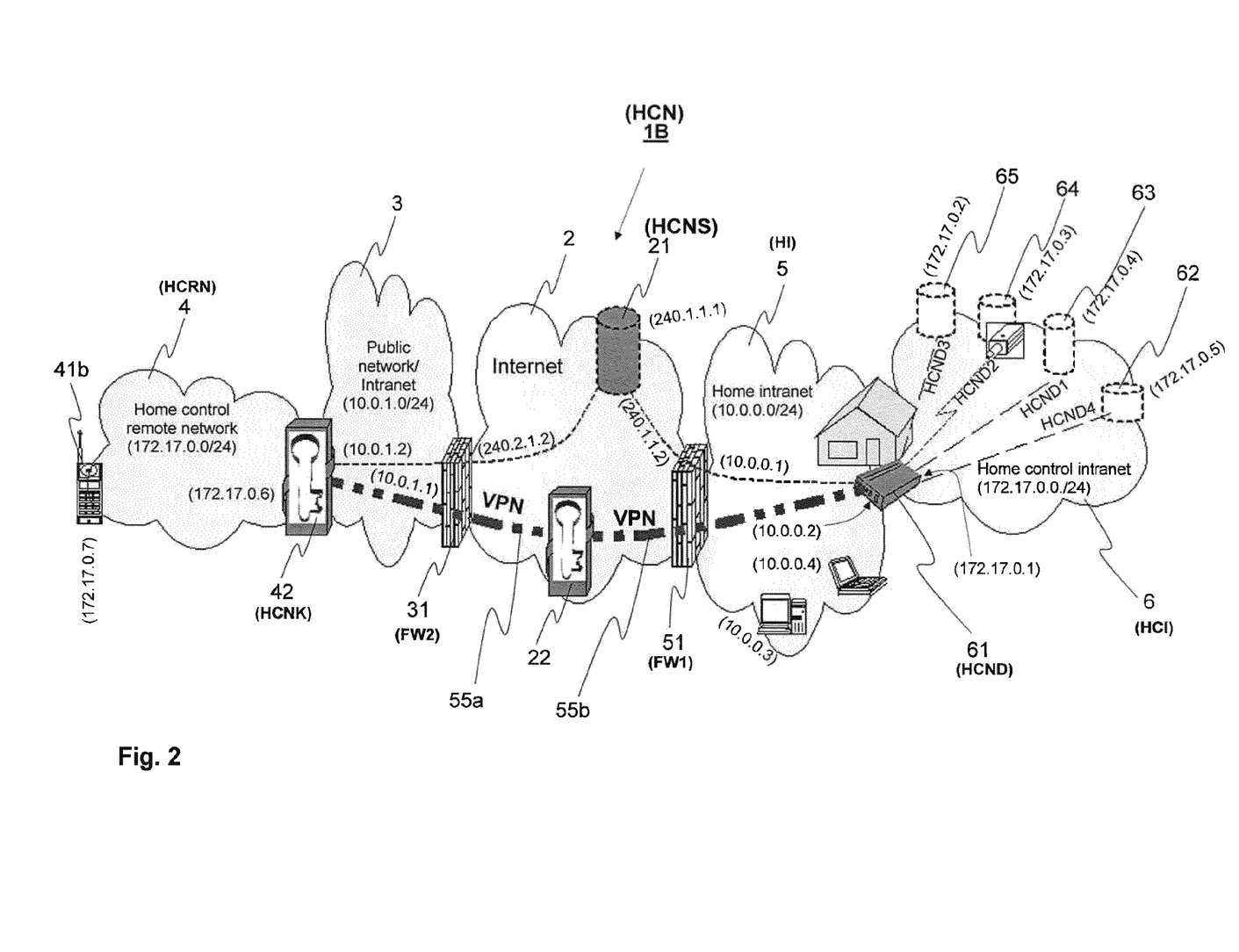
FIG. 2 shows a second example according to the invention, where a two-way data transfer connection is established between a client device handling remote control and an individual control and management device of a property.

FIGS. 1 and 2 show two advantageous embodiments 1A and 1B of the remote control system according to the invention. In the examples of FIGS. 1 and 2 one home control network key 42 is used to establish a data transfer connection to one home control network device 61. The home control network key 42 according to the invention can however also function with separate home control network devices in two or more properties.

In both embodiments of FIGS. 1 and 2 the data transfer network as a whole has the same basic network structure. In both FIGS. 1 and 2 the Internet is shown with reference 2. Some public network or an intranet, reference 3, is also connected to the Internet 2. The network 3 may be a permanent or wireless data transfer network. A first data transfer network 4, the house control remote network of the property, is connected to the network 3, to which house control remote network the client device implementing the remote control, references 41a and/or 41b, can be connected.

The house intranet in the property to be remote-controlled is in FIGS. 1 and 2 designated with reference 5. A second data transfer network 6, a house control intranet according to the invention, is connected to the house intranet network 5. The actuators 62-65 to be remote-controlled in the property are connected to the house control intranet.

It is evident to someone skilled in the art that there may also be more subnetworks between the home control network device 61 and/or home control network key 42 according to the invention and the Internet 2 than what is shown in FIGS. 1 and 2.

In the examples of FIGS. 1 and 2 the second network terminal according to the invention, the home control network device 61 (HCND), is connected to the house intranet network 10.0.0.0/24, reference 5. The house intranet network 5 is connected to the Internet 2 with network terminal 51. The network terminal 51 can be a router, a modem or a firewall, which can include also a network address translator NAT. In the examples of FIGS. 1 and 2 the house intranet 5 is behind a firewall FW1 containing a NAT function, reference 51. The public IP address of the firewall FW1 is 240.1.1.2 in the examples of FIGS. 1 and 2. In the house intranet 5 the internal IP address of the firewall FW1 is 10.0.0.1. Two exemplary other data processing devices are also connected to the house intranet network 5, the IP addresses of which in the house intranet network are 10.0.0.3 and 10.0.0.4.

The house control intranet network 172.17.0.0/24 (HCI), reference 6, is connected to the house intranet network 5 via the home control network device 61. The IP address of the home control network device 61 in the house control intranet net-work is 172.17.0.1 and in the house intranet network 10.0.0.2. In the examples in FIGS. 1 and 2 four exemplary devices/servers 62, 63, 64 and 65 are connected to the house control intranet 6. The devices/servers can be connected to the house control intranet 6 either with a permanent connection or a wireless data transfer connection.

Reference 62 shows a lighting control webserver, the IP address of which in the house control intranet network is 172.17.0.5. For a remote user the lighting control webserver 62 is seen as device HCND4.

Reference 63 shows a heat control webserver, the IP address of which in the house control intranet network is 172.17.0.4. For a remote user the heat control webserver 63 is seen as device HCND1.

Reference 64 shows a surveillance camera webserver, the IP address of which in the house control intranet network is 172.17.0.3. For a remote user the surveillance camera web-server 62 is seen as device HCND2.

Reference 65 shows an air-conditioning webserver, the IP address of which in the house control intranet network is 172.17.0.2. For a remote user the air-conditioning webserver 65 is seen as device HCND3.

In the examples of FIGS. 1 and 2 the first network terminal according to the invention, the home control network key 42 (HCNK), is connected to the house control remote network 172.17.0.0/24, reference 4. The house control remote net-work 4 is behind the intranet 3 firewall FW1, reference 31. The public IP address of the NAT firewall 31 is in this example 240.2.1.2 and the internal IP address of the NAT firewall is 10.0.1.1.

The house control remote network 172.17.0.0/24 (HCRN), reference 4, is connected to the data transfer network 3 via a home control network key 42 according to the invention. The IP address of the home control network key 42 in the intranet network is 10.0.1.2 and in the house control remote network 172.17.0.6. In the examples of FIGS. 1 and 2 an exemplary data processing device 41*a* or 41*b* has been connected to the house control remote network 4, the IP address of which data processing device in the house control remote network 4 is 172.17.0.7. This data processing device 41*a*/41*b* is used, when it is desired to remotely control devices/servers 62, 63, 64 or 65 connected to the house control intranet network 6.

The home control network key 42 and home control net-work device 61 according to the invention need each other's routing information, in order for them to be able to establish between them an end-to-end data transfer connection based on the data link layer or network layer, in the examples of FIGS. 1 and 2 a VPN data transfer connection 55. The routing information is stored by both the home control network key 42 and the home control network device 61 according to the invention in a home control network server 21 (HCNS) on the Internet.

In the example of FIG. 1 the NAT firewalls do not com-pletely restrict outgoing UDP communication. They are so-called NAT firewalls in one state and "with memory" which also do not change the source port numbers of UDP connec-tions (User Datagram Protocol) unforeseeably, if they do not have to. In the example of FIG. 1 the object is to establish in the data link layer an Ethernet level connection between the home control network key 42 and the home control network de-vice 61.

When in the remote control system 1A according to FIG. 1 it is desired to establish a data transfer connection 55 belong-ing to a virtual private network (VPN) be-tween the devices, then both devices 42 and 61 retrieve from the home control network server 21 the routing information stored therein by the counterpart device. Before surrendering the routing infor-mation, the home control network server 21 checks that it is really a question of an allowed home control network key/home control network device pair. With the aid of the retrieved routing information the home control network key 42 and the home control network device 61 establish a direct VPN connection between them. When the VPN connection 55 is completed, a data processing device 41*a*/41*b* in the house control remote network 4 can make contact with a device 62, 63, 64 or 65 in the house control network 6.

In order for it to be possible to establish the data transfer connection, the home control network key 42 and the home control network device 61 must determine their network path from their own network at least to the Internet 2. This network path determination can be made for example in the following manners, which the home control network key 42 and home control network device 61 advantageously utilise.

With a DHCP protocol (Dynamic Host Configuration Pro-tocol) the IP settings for the network interface of the data processing device can be retrieved. Settings obtainable with the DHCP procedure are at least the IP address of the data processing device, the network mask, the default gateway and the DNS server (Do-main Name System), which transforms the domain names into IP addresses.

A Traceroute procedure is a tool which uses a TCP/IP protocol, which determines along what route or network path packets transfer to the determined machine. In the Traceroute procedure a data transfer device connected to the network ascertains the network path by adding a "Time to Live" value (TTL) of the packets it sends one at a time, starting from zero.

Ascertaining the network path typically occurs in the fol-lowing way. The data processing device sends to a default gateway an IP packet with some target address in the external network using the TTL value "0". The default gateway responds to this with a "TTL expired" message. For example the IP address, delay etc. of the default gateway become clear from this message.

Thereafter the data processing device sends to the default gateway an IP packet with some target address in the external network using the TTL value 1. Again the router following the default gateway responds with a message "TTL expired", from which the IP address of this subsequent (second) router is clear. This transmission/response process is continued by increasing the TTL value until the desired goal is reached. In the case of the Internet the final goal is typically reached with a TTL value of 6-15. The final result is that the data processing device knows the network path to the outside world, for example the Internet.

An ICMP protocol (Internet Control Message Protocol) can be utilised for ascertaining external addresses. A "record route" flag of an ICMP packet is used in the ICMP procedure, which flag requests operating systems of the devices on the network path to record in the ICMP packet's title the IP address of the transmitting router.

In the examples of FIGS. 1 and 2 the first and second home control network key 42, the home control network double key 22 and the home control network device 61 determine the network path with at least one of the above-described procedures. These devices store the discovered network path on the home control net-work server 21, which stores them in its memory.

The home control network key 42 and the home control network device 61 according to the invention advantageously also have an ability to determine a free cyber space. Said devices are configured to determine for themselves an available cyber space automatically, by utilising the network path information on the home control network server 21. Said devices request the home control network server 21 to give some free part of the cyber space. The home control network server 21 goes through the network paths it has received and returns some network block, where not even one address is mentioned in the network path of any known device.

The home control network device 61 also advantageously offers DHCP and DNS services in its own subnetwork 4 and 6 for devices connected thereto. Additionally the home control network key 42 and the home control network device 61 function as a default gateway for devices connected to the subnetwork.

The following is an example of the operation of the remote control system 1A according to the invention in the example of FIG. 1.

The home control network device 61:

The home control network device 61 is connected to the 10.0.0.0/24 network (the house intranet 5) for example by attaching a cable to the WAN port of the home control network device 61. The home control network device 61 automatically retrieves its IP settings with the DHCP procedure. A firewall FW1 in the house intra-net network 5 advantageously functions as the DHCP server, which firewall gives the home control network device 61 the IP address 10.0.0.2 in a 24 bit network mask (255.255.255.0). The DHCP server also gives the default router address 10.0.0.1 and the DNS server address 10.0.0.1.

The home control network device 61 begins the communication by ascertaining with the aid of the DNS server the IP address of the home control network server 21 (HCNS, DNS address etahallinta.fi). The DNS server 10.0.0.1 gives the home control network server's 21 IP address as 240.1.1.1.

The home control network device 61 makes contact 240.1.1.1 with the home control network server 21 over the Internet with a TCP or UDP protocol. The home control network device 61 authenticates mutual operational rights with the home control network server 21 with certificates and/or passwords determined in connection with manufacturing. This data transfer connection is advantageously encrypted for example with an SSL/TLS encryption. The home control network server 21 sees from the incoming connection the public IP address of the home control network device 61, which in the example of FIG. 1 is 240.1.1.2. The home control network device 61 notifies the home control network server 21 of its own address and network mask (10.0.0.2/24). The home control network server 21 stores this information in its database.

The home control network device 61 advantageously also performs a traceroute operation toward the home control network server 21 and reports the discovered network path to the home control network server 21. The home control network server 21 stores the received network path of the home control network device 61 in its database.

Next the home control network device 61 advantageously also performs a ICMP record route operation and reports the discovered route to the home control net-work server 21. The home control network server 21 stores the route received from the home control network device 61 in its database.

Thereafter the home control network device 61 performs an automatic determination of free cyber space by sending an inquiry to the home control network server 21. The home control network server 21 returns to the home control network de-vice 61 in the examples of FIGS. 1 and 2 the cyber space 172.17.0.0/24.

The home control network device 61 takes the cyber space into use for its intranet 6, and as its own IP address the home control network device 61 takes 172.17.0.1. The home control network device 61 notifies the home control network server 21 about the taking into use, which server stores the information in its database.

The home control network key 42:

The WAN port of the home control network key 42 is connected to the 10.0.1.0/24 network (data transfer network 3). The home control network key 42 retrieves IP address information from the DHCP server, as which a firewall FW2 functions, reference 31. The home control network key obtains the IP address 10.0.1.2. The address of the default router 31 of the home control network key 42 is 10.0.1.1 and the address of the DNS server 31 is 10.0.1.1, which are obtained from the DHCP server.

The home control network key 42 begins the communication by ascertaining with the aid of the DNS server the IP address of the home control network server 21 (HCNS, DNS address hcns.fi). In the examples of FIGS. 1 and 2 the DNS server 10.0.1.1 gives 240.1.1.1 as the IP address of the home control network server 21.

Thereafter the home control network key 42 contacts the home control network server 21 on address 240.1.1.1 over the Internet primarily with a UDP protocol, secondarily with a TCP protocol. The home control network key 42 authenticates mutual operational rights with the home control network server 21 with pre-distributed certificates and/or passwords. The data transfer connection is advantageously encrypted for example with an SSL/TLS encryption. The home control network server 21 sees from the incoming connection the public IP address 240.2.1.2 of the home control network key 42. The home control network key 42 additionally notifies the home control network server 21 of its own address and network mask 10.0.1.2/24. The home control network server 21 stores this information in its database.

Next the home control network key 42 performs a traceroute operation and reports the discovered network path to the home control network server 21, which stores the information in its database.

The home control network key 42 advantageously also performs an ICMP record route operation and reports the discovered network path to the home control net-work server 21, which stores the information in its database.

The home control network server 21 checks the received route information and if there are overlaps, the home control network server 21 reports them to the home control network key 42, which if necessary performs the automatic determination of free cyber space again.

The control of an actuator by using the remote control system 1A.

Some device is connected to the remote control system 1A by connecting the device to be connected to an intranet interface of the home control network device 61 either with a permanent connection or wirelessly.

For example a heat control webserver 63 (HCWS) is connected to the house control intranet network 6. In this example, after the heat control webserver 63 is connected, the heat control webserver 63 retrieves its IP settings with the DHCP service. The heat control webserver obtains from the home control network device 61 172.17.0.4 as its own address, 172.17.0.1 as the address of the default router, 172.17.0.1 as the address of the DNS server. Additionally it obtains from the DNS server hcws.hcnd.local as its name in the example of FIG. 1.

The home control network device 61 stores the DHCP information it gives to the heat control webserver 63 in its local database.

The home control network key 42 is predetermined to pair up with the home control network device 61. In this way it is possible to establish a direct data transfer connection between the house control intranet 6 and the Ethernet network 3, to which the home control network key 42 is connected.

The home control network key 42 begins the pairing-up process. It notifies the home control network server 21 that it wants to establish a data transfer connection to the home control network device 61 advantageously by using the UDP protocol. The home control network server 21 decides that the requested data transfer connection should be established with the following port numbers:
  the home control network key: UDP source port 10500, UDP target port 10501, target IP address 240.1.1.2
  the home control network device: UDP source port 10501, UDP target port 10500, target IP address 240.2.1.2

The home control network server 21 reports this information to the home control network key 42 and the home control network device 61.

Thereafter the home control network key 42 sends the UDP packet to the address 240.1.1.2 with source port 10500 to the target port 10501. The sent packet gets through the firewall FW2, which contains a NAT function, because outgoing traffic is not strongly restricted. The FW2 firewall 31 remembers the UDP packet as a connection for the following X seconds with the contact information 10.0.0.2, 240.1.1.2, 10500 and 10501.

The UDP packet arrives at the FW1 firewall 51, which does not allow incoming traffic and it drops the packet. The packet does not arrive at the address 10.0.0.2.

The home control network device 61 sends a UDP packet to address 240.2.1.2 with source port 10501 to target port 10500. The sent UDP packet gets through the FW1 NAT firewall 51, because outgoing traffic is not restricted. The FW1 fire-wall 51 remembers the UDP packet as a connection for the following X seconds with the contact information 10.0.0.2, 240.2.1.2, 10501 and 10500.

The UDP packet arrives at the FW2 firewall 31. The FW2 firewall 31 remembers that the IP address 10.0.1.2 had established a UDP connection to address 240.1.1.2 with source port 10500 and target port 10501. Because the UDP packet comes from said source address 240.2.1.2, with source port 10501 and to target port 10500, the FW2 firewall 31 interprets the packet as return communication related to the connection established by the device 10.0.1.2. The firewall FW2 thereafter performs an address change operation. It changes the target address of the UDP packet to 10.0.1.2. Thereafter the FW2 firewall 31 routes the UDP packet to address 10.0.1.2. Now the home control network key 42 receives a message from the home control network device 61. A one-way data transfer connection from the home control network device 61 to the home control network key 42 now exists.

Next the home control network key 42 sends a UDP packet to the address 240.1.1.2 with source port 10500 to target port 10501. The UDP packet arrives at the FW1 firewall 51. The FW1 firewall 51 remembers that the address 10.0.0.2 had established a UDP connection to address 240.2.1.2 with source port 10501 and target port 10500. Because the packet comes from source address 240.2.1.2 with source port 10500 and to target port 10501, the FW2 firewall 51 interprets the received UDP packet as return communication to the connection established by the device 10.0.0.2. The FW1 firewall 51 performs an address change, i.e. changes the target address of the packet to 10.0.0.2. Thereafter the FW1 firewall 51 routes the packet to address 10.0.0.2.

Now a two-way UDP connection exists between the home control network key 42 and the home control network device 61. These devices can communicate with each other bi-directionally. The home control network device 61 and the home control network key 21 advantageously form a data link layer level VPN tunnel between them, using for example the Open-VPN software.

The home control network device 61 bridges the created VPN tunnel 55 with the house control remote network 172.17.0.0/24, reference 6, it administrates. In the same way the home control network key 42 bridges the created VPN tunnel 55 with its LAN port, so it is able to provide intranet interfaces in the network 172.17.0.0/24 on the data link layer level. After these operations the house control remote network 4 and the house control intranet 6 form a private VPN network over the Internet 2.

Now a client device 41a can be connected via the Ethernet to the intranet interface of the home control network key 42, which interface can for example be a LAN interface. After the made connection the client device 41a retrieves its IP settings from the home control network device 61 by using the DHCP protocol. The DHCP inquiry sent by the client device 41a or 41b goes to the LAN port of the home control network key 42, which port is bridged with the VPN tunnel 55. The home control network key 42 sends the Ethernet packet formed by the client device 41a or 41b as such to the VPN tunnel 55. The DHCP packet sent by the client device 41a or 41b arrives to the home control network device 61 along the VPN tunnel 55.

The home control network device 61 has a DHCP server, which responds in a return message with IP address 172.17.0.7/24, default router 172.17.0.1 and DNS server 172.17.0.1. The return message of the home control network device 61 correspondingly goes along the VPN tunnel 55 to the home control network key 42, which sends the packet onward to its LAN network interface. Through the LAN network interface the client device 41a or 41b receives the DHCP return packet and takes into use the settings included in the IP return packet. The IP address of the client device is now 172.17.0.7/24, the default router 172.17.0.1, the DNS server 172.17.0.1.

The client device 41a is now logically a part of the 172.17.0.0/24 VPN network and is able to communicate directly on the Ethernet level with device 172.17.0.4 just as if it was directly physically attached to the 172.17.0.0/24 network (house control intranet 6). The technical limitations of the VPN tunnel 55 and Internet connections, such as connection speed and delays, must however be taken into account when communicating.

Devices to be remote-controlled are connected to the LAN interface of the home control network device 61, either permanently or wirelessly. In the examples of FIGS. 1 and 2 the devices to be connected are an air-conditioning control 65, a heat control 63, a surveillance camera 64 and a lighting control 62. The webservers of the devices to be remote-controlled receive their IP address from a DHCP server advantageously comprised in the home control network device.

The home control network device 61 names the IP addresses it gives in a predetermined manner. In the examples of FIGS. 1 and 2 the IP address 172.17.0.4 is "HCND1", which is the heat control. Correspondingly IP address 172.17.0.3 is "HCND2", which is the surveillance camera.

The client device 41 user can now communicate directly on the Ethernet level with the devices 62, 63, 64 and 65 to be remote-controlled presented in FIG. 1. The communication does not differ from the manner which would be used, if the client device 41a was directly physically attached to the house control intranet network 172.17.0.0/24 serving the devices to be remote-controlled.

When utilising the remote control system 1A according to the invention the client device 41a user enters for example http://hcnd1 as an address in the browser. The client device's browser makes a DNS inquiry to the home control network device 61 (from address 172.17.0.1) for the name "HCND1". The home control network device 61 returns to the client device 41a the name with the IP address 172.17.0.4 of HCND1. The user's client device 41a browser advantageously opens with HTTP the page http://HCND1 from the heat control webserver 172.17.0.4. The user now has a direct management connection to the heat control webserver 63 controlling the heat controls.

The client device 41a user can also perform an address search for the primary name "HCND". The home control network device 61 responds to the inquiry with its own IP address 172.17.0.1 and provides an index page to be seen in the user's client device 41a browser. On the index page the user sees in a list form all the re-sources attached to the LAN interface of the home control network device 61. In the example of FIGS. 1 and 2 the following list is seen in the browser:

hcnd1 172.17.0.4
hcnd2 172.17.0.3
hcnd3 172.17.0.2
hcnd4 172.17.0.5

On the index page it is possible for the client device user to rename the presented objects, e.g. "HCND1" with the name "heat control" and "HCND2" with the name "surveillance camera". The home control network device automatically stores the name changes for the IP addresses in question. Now the client device 41a user can contact for example the heat control by entering only "heat control" in the browser line.

In an embodiment according to remote control system 1B shown in FIG. 2, a separate home control network double key 22 is utilised in some rarely occurring remote connection problems. The home control network double key 22 ensures that a VPN connection is obtained also in these targets. In FIG. 1 the VPN tunnelling 55 is possible to provide directly between the home control network device 61 and the home control network key 42.

If for some reason the creation of such a direct VPN tunnel does not succeed with the method according to the first embodiment of the invention or succeeds sporadically, the remote control system 1B according to FIG. 2 can be utilised. In the remote control system of FIG. 2 the home control network double key 22 assists in creating a VPN tunnel by bridging VPN tunnels 55a and 55b. For the client device user the remote control system functions in the same way, whether the remote control system according to FIG. 1 or FIG. 2 is used.

FIG. 2 shows a remote control system 1B according to a second advantageous embodiment of the invention. With regards to its main parts the data transfer net-work arrangement 1B corresponds to the data transfer network arrangement 1A according to FIG. 1. As an addition this embodiment uses a second home con-trol network double key 22 (HCN2K) on the Internet 2 for establishing the data transfer connection 55a and 55b.

The embodiment of the invention according to FIG. 2 can be used in connection with different, rarely occurring routing problems. The embodiment according to remote control system 1B ensures that also in such problem cases, a remote connection to the target can be established without target-specific programming performed in the remote control target by a network specialist. The embodiment according to FIG. 2 is necessary in situations where the home control network key/home control network device pair for some exceptional reason cannot achieve direct contact with each other, such as for example due to very communication-restricted NAT firewall settings.

A connection establishing problem arises if for example a NAT firewall in some data transfer connection replaces the outgoing UDP connection source port with some other than what the contacting device has originally requested. Thus the connection establishing does not necessarily succeed. The same thing might happen if, in addition to a complete blocking of incoming traffic, also the use of the outgoing ports is highly restricted or if the UDP connections are completely blocked.

The embodiment according to FIG. 2 can also be used in a network, where the NAT operating environment is exceptionally complicated. A situation can be mentioned as an example, where devices behind two different double firewalls want to communicate with each other, but cannot for some reason ascertain the external addresses of the NAT firewalls.

In the embodiment of FIG. 2 the home control network double key 22 functions as a device bridging the VPN connection between the home control network key 42 and the home control network device 61. In this embodiment all communication passes through the home control network double key 22. Also the home control network double key 22 is equipped with an automatic IP address search. If necessary, it is however possible to determine a fixed IP address for this home control network double key. The home control network double key 22 also supports tunnels created both in http and HTTPS connections. The home control network double key 22 is advantageously also equipped with a proxy server support, by using which the property control method according to the invention can be used also when roaming through foreign data transfer networks.

When a problem connection occurs, on which the connection establishing correction logic of the remote control system 1A presented in FIG. 1 does not work, then a home control network double key 22 included in the remote control system 1B according to FIG. 2 is sent to the customer.

As a first measure the home control network double key 22 and the actual home control network key 42 are used while physically attached to each other's network interface, whereby the home control network double key 22 retrieves device pair information for itself from the memory of the actual home control network key 42. Thereafter the home control network double key 22 is connected to the public Internet 2. Thus the home control network double key 22 obtains a public IP address from the Internet network 2. After it has obtained the public IP address the home control network double key 22 makes contact with the home control network server 21. The home control network server 21 correspondingly stores in its database information about the public IP address of the home control network double key 22 and the network path inquiries it has made. Thereafter the home control network double key 22 notifies the home control network server 21 about which its home control network key 42 is. The home control network double key 22 has received the information regarding this home control network key 42 when it was connected to the network interface of the home control network key 42. The home control network server 21 thereafter sends to the home control network double key 22 the information regarding the home control network device 61 of the home control network key 42 in question.

In the remote control system 1B according to FIG. 2 the home control network key 42 and the home control network device 61 receive information about a new "additional member" from the home control network server 21. Thereafter they request the public IP address of the home control network double key 22 from the home control network server 21. Thereafter both the home control network key 42 and the home control network device 61 can if necessary directly contact the public address of the home control network double key 22. The relaying of packets from the home control network device 61 or the first home control network key 42 via the home control network double key 22 through the firewalls FW1 and FW2 is successful, because the firewalls 31 and 51 always at least let through outgoing TCP packets to the home control network double key 22. On the other hand the firewalls FW1 and FW2 interpret the packets coming from the home control network double key 22 as response packets to packets sent earlier to the home control network double key 22 from the subnetwork 3 or 4 they protect. Therefore the firewalls FW1 and FW2 let these packets received from the home control network double key 22 through into the subnetwork 3 or 4 they protect. In this way VPN tunnels 55a and 55b can be formed also in these above-described, rarely occurring problem cases.

The home control network double key 22 is arranged to "bridge" the VPN connection of the home control network device pair 42 and 61, so that it functions as a communication mediator between these two devices 42 and 61. This advantageously takes place by bridging the data link layer VPN tunnels 55a and 55b together in the home control network double key 22 in the above-described manner. After the bridging the home control network device pair 42 and 61 has a direct Ethernet level data transfer connection between them.

Figure 3:
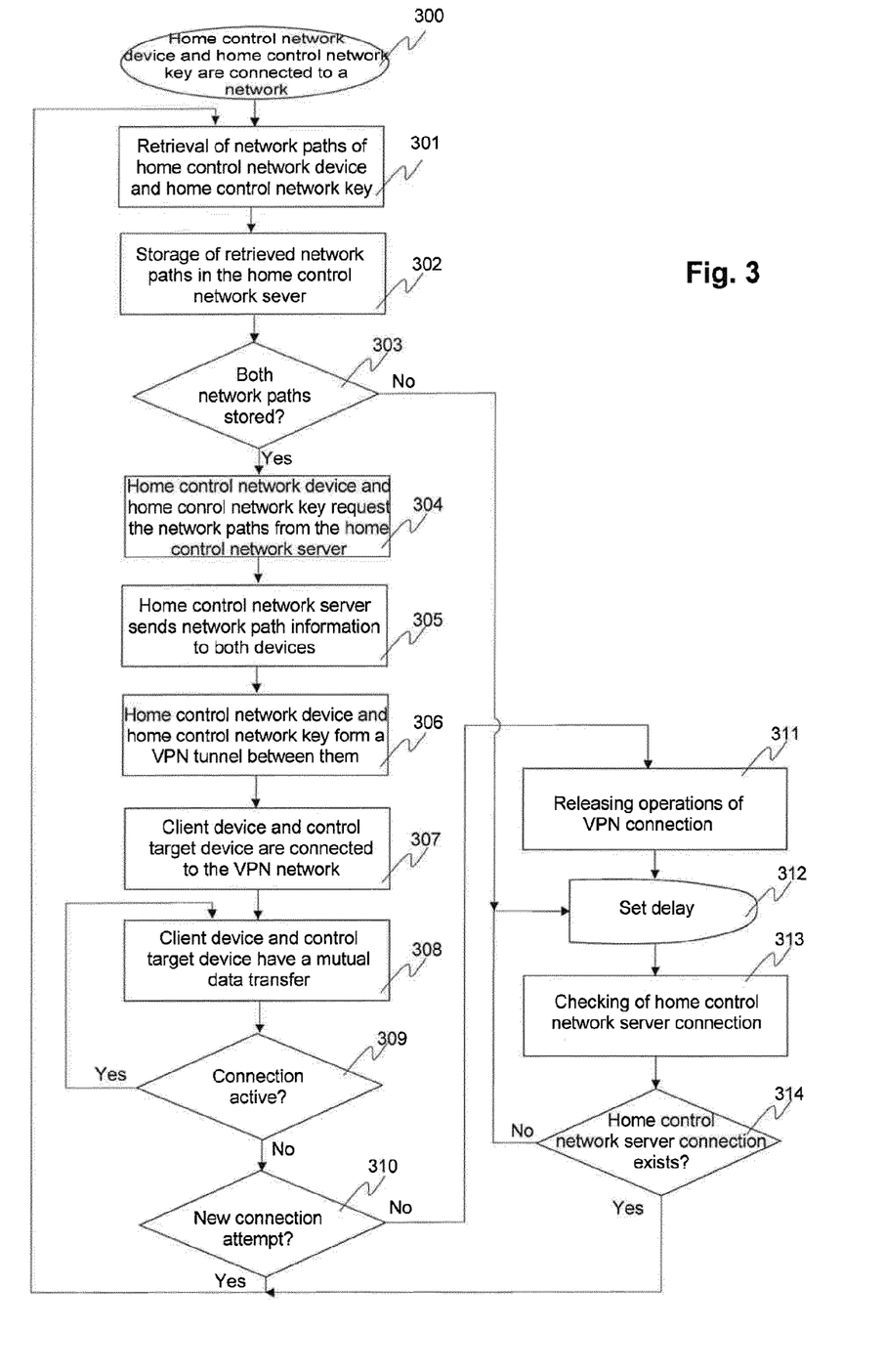
FIG. 3 shows as an exemplary flow chart how the data transfer connection between the client device and the device in the property is established.

In connection with FIGS. 1 and 2 an example has been used to show how the client device and the device to be remote-controlled in the property can be made to exchange information and control commands in the remote control system ac-cording to the invention. FIG. 3 shows the above-described procedures as a flowchart.

In step 300 the home control network device 61 is connected to the house intranet network 5 and the home control network key 42 to the intranet network 3. All devices to be remote-controlled in the property are connected to the home control network device 61 either with a permanent connection or a wireless connection.

In step 301 both the home control network device 61 and the home control network key 42 determine their network path. In step 302 both the home control network device 61 and the home control network key 42 stores their determined network paths on the home control network server 21.

In step 303 the devices 42 and 61 according to the invention to be utilised in the remote-controlling receive information that their device pair has registered with the home control network server 21 or that the registration is missing. If one of the devices 42 or 61 according to the invention belonging to the device pair has not registered, then the remote control system 1A or 1B moves after a specified delay 312 to the listening step 313 of the home control network server connection.

At the start of the connection establishing, both the home control network key 42 and the home control network device 61 request in step 304 the network path of the counterpart from the home control network server 21. The home control net-work server 21 checks that it is a question of an allowed device pair, and after the checking it sends the network paths to both devices in step 305. Thereafter the home control network server 21 releases the connection to both devices 42 and 61 and thus it is no longer a part of the VPN tunnel 55 or 55a+55b being formed.

In step 306 the home control network key 42 and the home control network device 61 form a VPN tunnel 55 or 55a+55b between them.

In step 307 both the user's client device 41a or 41b and the target device 62-65 in the property are connected to the established VPN network. The user's client device 41a or 41b is connected to the VPN network by the home control network key 42. The device 62-65 to be remote-controlled in the target is connected to the VPN network by the home control network device 61.

In step 308 the user's client device 41a or 41b and the device 62-65 in the property are part of the same VPN network, whereby they may exchange information with each other. After a delay specified in the remote control system, step 309 consists of checking whether the data transfer connection between the client device 41a/41b and the target device 62-65 is still active. If the data transfer connection is active, the process returns to step 308 and the data transfer is allowed to continue.

If it is in step 309 found that the VPN connection is no longer active, then a decision is made in step 310 regarding a possible new attempt at establishing a connection. If it is decided to make a new attempt at establishing a connection, then the process returns to step 301. In this alternative the process advantageously also includes necessary procedures for releasing the VPN connection, so that the connection establishing process according to the invention itself can be renewed successfully. The connection establishing is attempted according to a predetermined number.

If it is in step 310 decided that a new attempt to establish a VPN connection is no longer made, because a predetermined number of connection establishing attempts have been made or it is for some other reason not desired to establish a VPN connection, then the process moves to step 311. In step 311 the used VPN data transfer network is released.

After the VPN data transfer network is released, a predetermined delay 312 follows in the process utilised in the remote control system 1A or 1B. After the delay 312 the process moves to the listening function 313 of the home control network server. There the current-carrying home control network device 61 sends contact requests via the network to the home control network server 21.

The home control network device 61 repeats the process, step 314, until a network connection to the home control network server 21 is established.

When a data transfer connection to the home control network server 21 is established, then in step 314 a decision is made about moving to a process of establishing a VPN connection, whereby the process returns to step 301.

All the above-described process steps are implemented with program commands, which are performed in a suitable special-purpose or general-purpose processor. The program commands are stored on a storage medium utilised by the home control network device 61 and home control network key 42, such as memories, from which the processor can retrieve and implement them. The references to computer-readable medium can for example also contain special components, such as programmable USB Flash memories, logic arrays (FPLA), application-specific integrated circuits (ASIC) and signal processors (DSP).

Figure 4:
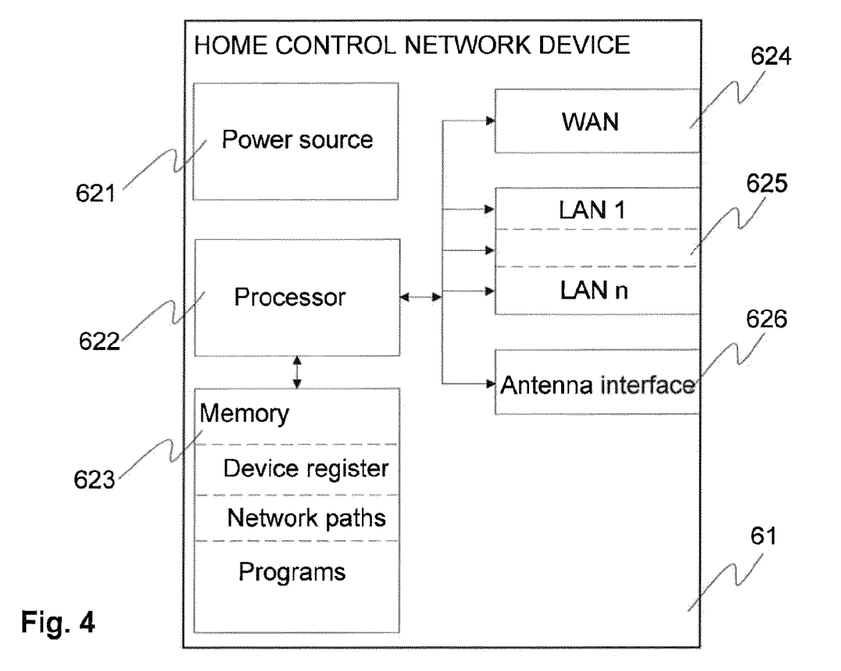
FIG. 4 shows as an example a home control network device according to the invention.

FIG. 4 shows the functional main parts of the home control network device 61 according to the invention. The home control network device 61 has a power source 621. It can be an accumulator or a power source based on mains current. All the electric components of the home control network device get their operating voltage from the power source 621.

The home control network device 61 has one or more processors 622. The processor or processor means can comprise an arithmetic logic unit, a group of different registers and control circuits. A data storing arrangement 623, such as a memory unit or memory means, whereon computer-readable information or pro-grams or user information can be stored, has been connected to the processor means. The memory means 623 typically contain memory units, which allow both reading and writing functions (Random Access Memory, RAM), and memory units containing non-volatile memory, from which data can only be read (Read Only Memory, ROM). The identification information of the device, its current network path, the identification information of the home control network key 42 functioning as its pair and all the programs needed for the operation of the home control network device 61 are advantageously stored in the memory means.

Some examples of programs stored in the memory of the home control network device 61 are an operating system (e.g. Linux), TCP/IP programs, a VPN program (e.g. OpenVPN), a DHCP client device/server program (e.g. ISC DHCP), a DNS server program (e.g. dnsmasq), a database program (e.g. SQLite), a remote control program (e.g. OpenSSH), a certificate management/confirmation program (e.g. GPG) and a user interface library (e.g. LuCI).

The home control network device 61 also comprises interface elements, which comprise an input/output or input/output means 624, 625 and 626 for receiving or sending information. The information received with the input means is transferred to be processed by the processor means 622 of the home control network device 61. The interface elements of the home control network device transfer information either to the data transfer network or to external data processing devices. The interface elements of the home control network device 61 are advantageously a WAN port 624, one or more LAN ports 625 and an antenna port 626.

Figure 5A:
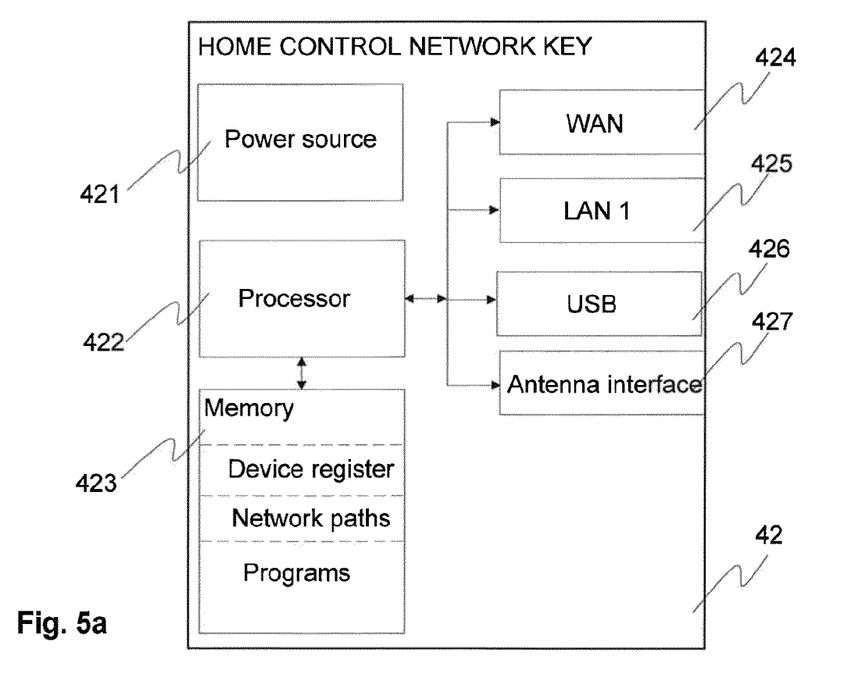
FIG. 5a shows as an example a home control network key according to the invention.

FIG. 5a shows the functional main parts of the home control network key 42 ac-cording to the invention. The home control network device 42 has a power source 421. It can be an accumulator or a power source based on mains current. All the electric components of the home control network device get their operating voltage from the power source 421.

The home control network key 42 has one or more processors 422. The processor or processor means can comprise an arithmetic logic unit, a group of different registers and control circuits. A data storing arrangement 423, such as a memory unit or memory means, whereon computer-readable information or programs or user information can be stored, has been connected to the processor means. The memory means 423 typically contain memory units, which allow both reading and writing functions (Random Access Memory, RAM), and memory units containing non-volatile memory, from which data can only be read (Read Only Memory, ROM). The identification information of the device, its current network path, the identification information of the home control network devices functioning as its device pairs and all the programs needed for the operation of the home control network key 42 are advantageously stored in the memory means.

Some examples of programs stored in the memory of the home control network key 42 are an operating system (e.g. Linux), TCP/IP programs, a VPN program (e.g. OpenVPN), a DHCP server/client device program (e.g. ISC DHCP), a DNS server program (e.g. dnsmasq), a database program (e.g. SQLite), a remote control program (e.g. OpenSSH), a certificate management/confirmation program (e.g. GPG) and a user interface library (e.g. LuCI).

The home control network key 42 also comprises interface elements, which comprise an input/output or input/output means 424, 425 and 426 for receiving or sending information. The information received with the input means is transferred to be processed by the processor means 422 of the home control network key 42. The interface elements of the home control network device transfer information either to the data transfer network or to external data processing devices. The interface elements of the home control network device 42 are advantageously a WAN port 424, a LAN port 425, a USB port 426 and an antenna port 627.

Figure 5B:
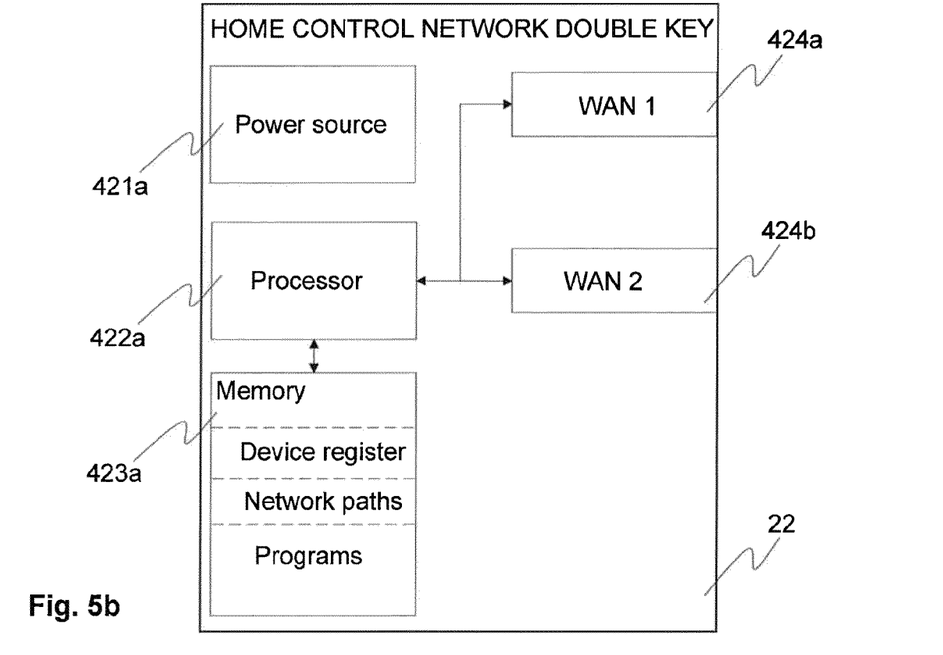
FIG. 5b shows as an example a home control network double key according to the invention and FIG. 6 shows as an example a home control network server according to the invention.

FIG. 5b shows the functional main parts of the home control network double key 22 according to the invention. The home control network double key 22 has a power source 421a. It can be an accumulator or a power source based on mains current. All the electric components of the home control network double key 22 get their operating voltage from the power source 421.

The home control network double key 22 has one or more processors 422a. The processor or processor means can comprise an arithmetic logic unit, a group of different registers and control circuits. A data storing arrangement 423a, such as a memory unit or memory means, whereon computer-readable information or pro-grams or user information can be stored, has been connected to the processor means. The memory means 423a typically contain memory units, which allow both reading and writing functions (Random Access Memory, RAM), and memory units containing non-volatile memory, from which data can only be read (Read Only Memory, ROM). The identification information of the device, its current network path, the identification information of the home control network key 42 and home control network device 61 functioning as its device pairs and all the programs needed for the operation of the home control network double key 22 are advantageously stored in the memory means.

Some examples of programs stored in the memory of the home control network double key 22 are an operating system (e.g. Linux), TCP/IP programs, a VPN program (e.g. OpenVPN), a DHCP client device program (e.g. ISC DHCP), a database program (e.g. SQLite), a certificate management/ confirmation program (e.g. GPG) and a user interface library (e.g. LuCI).

The home control network double key 22 also comprises interface elements, which comprise an input/output or input/ output means 424a and 424b for receiving or sending information. The information received with the input means is transferred to be processed by the processor means 422a of the home control network double key 22. The interface elements of the home control network device transfer information either to the data transfer network or to external data processing devices. The interface elements of the home control network double key 22 are advantageously WAN ports 424a and 434b, of which there are two or more.

Figure 6:
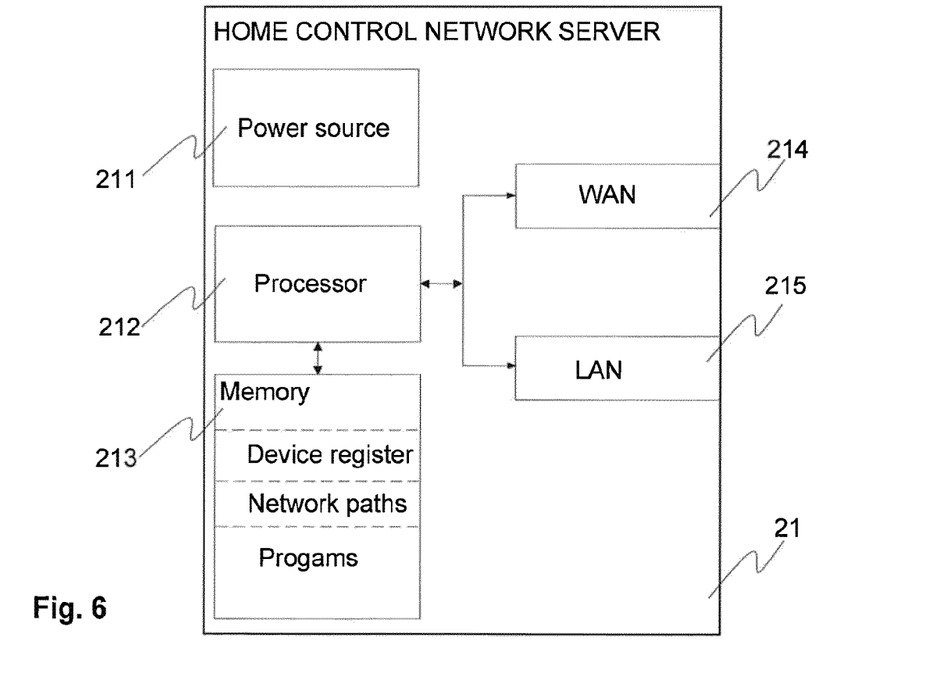

FIG. 6 shows the functional main parts of the home control network server 21. The home control network server 21 comprises a power source 211. It can be an accumulator or a power source based on mains current. All the electric components of the home control network server 21 get their operating voltage from the power source 211.

The home control network server 21 has one or more processors 212. The processor or processor means can comprise an arithmetic logic unit, a group of different registers and control circuits. A data storing arrangement 213, such as a memory unit or memory means, whereon computer-readable information or programs or user information can be stored, has been connected to the processor means. The memory means 213 typically contain memory units, which allow both reading and writing functions (Random Access Memory, RAM), and memory units containing non-volatile memory, from which data can only be read (Read Only Memory, ROM). The identification data of the device pairs in the remote control system, the current network paths of each device pair and all the programs needed for establishing the VPN data transfer connection to be established between the device pairs are advantageously stored in the memory means.

Some examples of programs stored in the memory of the home control network server 21 are an operating system (e.g. Linux), TCP/IP programs, a DHCP server/client device program (e.g. ISC DHCP), a DNS server program (e.g. bind), a database program (e.g. SQLite), a certificate management/ confirmation program (e.g. GPG) and a user interface library (e.g. LuCI).

The home control network server 21 also comprises interface elements, which comprise an input/output or input/output means 214 and 215 for receiving or sending information. The information received with the input means is transferred to be processed by the processor means 222 of the home control network server 21. The interface elements of the home control network server 21 transfer information either to the data transfer network or to external data processing devices. The interface elements of the home control network server 21 are advantageously a WAN port 214 and one or more LAN ports 215.

The home control network server 21 advantageously also comprises a user inter-face (not shown in FIG. 6), which comprises means for receiving information from the server 21 user. The user interface can comprise a keyboard, a touch screen, a microphone and a speaker.

Some advantageous embodiments of the remote control method and remote control system according to the invention have been described above. The invention is not limited to the solutions described above, but the inventive idea can be applied in numerous ways within the scope of the claims.

The invention claimed is:

1. A remote control method for actuators in a property, in which a virtual private network is created between a user's client device controlling the actuators and situated in a first data transfer network and an actuator to be remotely controlled and situated in a second data transfer network, the method comprising:
   connecting the client device to a first network terminal in the first data transfer network,
   connecting the actuator, by remote-control to a second network terminal in the second data transfer network:
   wherein both the first network terminal and the second network terminal make contact with a home control network server residing in the Internet;
   wherein both the first network terminal and the second network terminal request routing information from the home control network server for establishing an end-to-end data transfer connection between said network terminals; and
   wherein the home control network server sends, after receiving routing requests from both the first network terminal and the second network terminal, the requested routing information to the first network terminal and the second network terminal, by using, which the first network terminal and the second network terminal establish among themselves the virtual private network to which the home control network server does not belong,
   wherein the home control network server identifies the first network terminal and the second network terminal as a during manufacturing defined device pair before sending the network path information needed for forming the virtual private network to the first network terminal and the second network terminal; and
   wherein the virtual private network formed between the first network terminal and the second network terminal, to which virtual private network both the client device and the device to be remote-controlled are connected, is formed either in the OSI model data link layer (Layer 2) or in the network layer (Layer 3).

2. The remote control method according to claim 1, further comprising:
   determining by the first network terminal the network path from the first data transfer network to the Internet and determining by the second network terminal the network path from the second data transfer network to the Internet and the first and the second network terminal storing the determined network path information on the home control network server, and
   wherein the home control network server sends to the first and second network terminal, the determined network paths in order to form e the virtual private network.

3. A remote control system for actuators in a property, the system comprises:
   a first data transfer network, to a first network terminal connected to which a user's client device controlling actuators to be remote-controlled is connected;
   at least one second data transfer network, to a second network terminal connected to which actuators to be remote-controlled are connected;
   one or several other data transfer networks between the first data transfer network and the second data transfer network, one of which is the Internet network, and a home control network server connected to the Internet, wherein;
   the first network terminal and the second network terminal are configured to establish a data transfer connection to the home control network server in order to establish a mutual end-to-end data transfer connection between said network terminals;
   the first network terminal and the second network terminal are configured to request routing information from the home control network server for establishing an end-to-end data transfer connection between said network terminals;
   wherein the home control network server, after receiving routing requests from both the first network terminal device and the second network terminal device, is configured to send the routing information to the first network terminal and the second network terminal, by using which the first network terminal and the second network terminal are arranged to establish among themselves a virtual private network, to which the home control network server does not belong;
   wherein the home control network server is configured to identify the first network terminal and the second network terminal as a during manufacturing defined device pair before sending the network path information needed for forming the virtual private network to the first network terminal and the second network terminal; and
   wherein the virtual private network configured to be formed between the first network terminal and the second network terminal, to which virtual private network both the client device and the device to be remote-controlled are connected, is configured to be formed either in the OSI model data link layer (Layer 2) or in the network layer (layer 3).

4. The remote control system according to claim 3 wherein;
the first network terminal is configured to determine the network path from the first data transfer network to the Internet and the second network terminal is configured to determine the network path from the second data transfer network to the Internet and that the first and the second network terminal are configured to store the determined network path information on the home control network server, and wherein;
the home control network server is configured to send to the first and second network terminal, the determined network paths in order to form the virtual private network.

5. A home control network key for actuators in a property, which comprises:
network interface elements, which comprise input and output means for network interfaces;
a processor,
and a memory, which contains non-transitory computer program code;
wherein the processor, the memory and the stored non-transitory computer program code are configured to:
determine a network path from the home control network key to the Internet;
store the determined network path both in the memory of the home control network key and in a memory of a home control network server residing in the Internet;
request from the home control network server a network path information of a during manufacturing defined network terminal pair in order to establish an end-to-end data transfer connection between said network terminals;
receive from the home control network server the network path information of its network terminal device pair;
and establish with the aid of the received network path information with the predetermined network terminal pair a virtual private network for the remote control of the actuators of the property, to which the virtual private network the home control network server does not belong;
wherein the home control network server identifies the first network terminal and the second network terminal as a during manufacturing defined device pair before sending the network path information needed for forming the virtual private network to the first network terminal and the second network terminal; and
wherein the virtual private network formed between the first network terminal and the second network terminal, to which virtual private network both the client device and the device to be remote-controlled are connected, is formed either in the OSI model data link layer (Layer 2) or in the network layer (Layer 3).

6. A home control network device for actuators in a property, which comprises:
network interface elements, which comprise input and output means for a network interface and devices to be remote-controlled;
a processor,
and a memory, which contains non-transitory computer program code;
wherein the processor, the memory and the stored non-transitory computer program code are configured to:
determine a network path from the home control network device to the Internet;
store the determined network path both in the memory of the home control network device and in a memory of a home control network server residing in the Internet;
request from the home control network server a network path information of a during manufacturing defined network terminal pair in order to establish an end-to-end data transfer connection between said network terminals;
receive from the home control network server the network path information of the network terminal device pair;
and establish with the aid of the received network path information with the network terminal pair a virtual private network for the remote control of the actuators of the property, to which the virtual private network the home control network server does not belong;
wherein the home control network server identifies the first network terminal and the second network terminal as a during manufacturing defined device pair before sending the network path information needed for forming the virtual private network to the first network terminal and the second network terminal; and
wherein the virtual private network formed between the first network terminal and the second network terminal, to which virtual private network both the client device and the device to be remote-controlled are connected, is formed either in the OSI model data link layer (Layer 2) or in the network layer (Layer 3).

7. A home control network server, which comprises:
network interface elements, which comprise input and output means;
a processor,
and a memory, which contains non-transitory computer program code,
wherein the processor, the memory and the stored non-transitory computer program code are configured to:
store in the memory of the home control network server the identification information of a during manufacturing defined network terminal pair formed by two network terminal used for remote control of a property;
receive from the network terminal pair network path information they have determined;
receive from the first network terminal a network path information request of a predetermined network terminal pair;
receive from the second network terminal a network path information request of the predetermined network terminal pair;
check which is the predefined network terminal device pair of the first network terminal that made the network path request;
identify the first network terminal device and the second network terminal device as a predefined device pair;
and if identified as the predetermined device pair;
send the network path information of the network terminal pair both to the first network terminal and the second network terminal;
receive cyber space information in use in connection with the network terminal pair and send the allowed cyber space information to the home control network device;
and release the data transfer connection to the network device pair after the network path information is sent;
wherein the home control network server identifies the first network terminal and the second network terminal as the during manufacturing defined device pair before sending the network path information needed for forming a virtual private network to the first network terminal and the second network terminal; and wherein the virtual private network formed between the first network terminal and the second network terminal, to which virtual private network both the client device and the device to be remote-controlled are connected, is formed either in the OSI model data link layer (Layer 2) or in the network layer (Layer 3).

* * * * *